(12) United States Patent
Boardman et al.

(10) Patent No.: US 9,650,959 B2
(45) Date of Patent: May 16, 2017

(54) FUEL-AIR MIXING SYSTEM WITH MIXING CHAMBERS OF VARIOUS LENGTHS FOR GAS TURBINE SYSTEM

(71) Applicant: General Electric Company, Schenectady, NY (US)

(72) Inventors: Gregory Allen Boardman, Greer, SC (US); Patrick Benedict Melton, Horse Shoe, NC (US); James Harold Westmoreland, Greer, SC (US); Ronald James Chila, Schenectady, NY (US); Sarah Lori Crothers, Greenville, SC (US)

(73) Assignee: General Electric Company, Schenectady, NY (US)

( * ) Notice: Subject to any disclaimer, the term of this patent is extended or adjusted under 35 U.S.C. 154(b) by 1124 days.

(21) Appl. No.: 13/797,848

(22) Filed: Mar. 12, 2013

(65) Prior Publication Data

US 2014/0260299 A1    Sep. 18, 2014

(51) Int. Cl.
| | |
|---|---|
| *F02C 7/22* | (2006.01) |
| *F23R 3/28* | (2006.01) |
| *F23D 14/62* | (2006.01) |
| *F23R 3/10* | (2006.01) |
| *F23D 14/64* | (2006.01) |
| *F23R 3/22* | (2006.01) |

(52) U.S. Cl.
CPC .................. *F02C 7/22* (2013.01); *F23R 3/10* (2013.01); *F23R 3/286* (2013.01); *F23D 14/62* (2013.01); *F23D 14/64* (2013.01); *F23R 3/22* (2013.01); *Y02T 50/675* (2013.01)

(58) Field of Classification Search
CPC .... F02C 7/22; F23R 3/22; F23R 3/286; F23D 14/62; F23D 14/64
See application file for complete search history.

(56) References Cited

U.S. PATENT DOCUMENTS

| | | | | |
|---|---|---|---|---|
| 1,855,165 | A | * | 4/1932 | Barker ................. B01D 53/944 |
| | | | | 181/239 |
| 2,564,042 | A | * | 8/1951 | Walker ...................... F02K 1/15 |
| | | | | 60/224 |
| 3,581,492 | A | | 6/1971 | Norgren et al. |
| 4,408,461 | A | | 10/1983 | Bruhwiler et al. |
| 4,587,809 | A | | 5/1986 | Ohmori et al. |
| 4,763,481 | A | | 8/1988 | Cannon |
| 5,121,597 | A | | 6/1992 | Urushidani et al. |

(Continued)

OTHER PUBLICATIONS

U.S. Appl. No. 13/797,859, filed Mar. 12, 2013, Boardman et al.

(Continued)

*Primary Examiner* — Phutthiwat Wongwian
*Assistant Examiner* — Eric Linderman
(74) *Attorney, Agent, or Firm* — Fletcher Yoder, P.C.

(57) ABSTRACT

Embodiments of the present disclosure are directed to systems and methods for premixing fuel and air prior to combustion within a combustion chamber. The system includes a plurality of fuel injectors and a plurality of mixing tubes, wherein each mixing tube has a first portion for receiving one of the plurality of fuel injectors and a second portion having a mixing chamber that is configured to mix fuel and air. The length of the mixing chamber varies among the plurality of mixing tubes to allow for different mixing times.

20 Claims, 6 Drawing Sheets

(56) References Cited

U.S. PATENT DOCUMENTS

| | | | |
|---|---|---|---|
| 5,235,814 A * | 8/1993 | Leonard | F23R 3/283 60/738 |
| 5,274,991 A | 1/1994 | Fitts | |
| 5,361,586 A * | 11/1994 | McWhirter | F23D 14/02 60/737 |
| 5,410,884 A | 5/1995 | Fukue et al. | |
| 5,415,000 A | 5/1995 | Mumford et al. | |
| 5,515,680 A | 5/1996 | Fujimura et al. | |
| 5,611,196 A | 3/1997 | Wilson | |
| 5,675,971 A | 10/1997 | Angel et al. | |
| 5,778,676 A | 7/1998 | Joshi et al. | |
| 5,822,992 A | 10/1998 | Dean | |
| 5,901,555 A | 5/1999 | Mandai et al. | |
| 5,927,076 A * | 7/1999 | Pillsbury | F23D 14/74 60/733 |
| 5,943,866 A * | 8/1999 | Lovett | F23R 3/286 431/114 |
| 6,016,658 A * | 1/2000 | Willis | F23R 3/02 239/405 |
| 6,026,645 A | 2/2000 | Stokes et al. | |
| 6,038,861 A | 3/2000 | Amos et al. | |
| 6,092,363 A * | 7/2000 | Ryan | F02C 3/20 60/39.463 |
| 6,164,055 A | 12/2000 | Lovett et al. | |
| 6,334,309 B1 | 1/2002 | Dean et al. | |
| 6,351,948 B1 | 3/2002 | Goeddeke | |
| 6,360,776 B1 | 3/2002 | McCormick et al. | |
| 6,363,724 B1 | 4/2002 | Bechtel et al. | |
| 6,530,222 B2 | 3/2003 | Stuttaford et al. | |
| 6,532,742 B2 | 3/2003 | Scarinci et al. | |
| 6,705,087 B1 | 3/2004 | Ohri et al. | |
| 6,832,483 B2 | 12/2004 | Moriya et al. | |
| 6,880,340 B2 | 4/2005 | Saitoh | |
| 7,007,486 B2 * | 3/2006 | Sprouse | F23L 15/04 60/737 |
| 7,134,287 B2 | 11/2006 | Belsom et al. | |
| 7,171,813 B2 | 2/2007 | Tanaka et al. | |
| 7,181,916 B2 | 2/2007 | Ziminsky et al. | |
| 7,284,378 B2 | 10/2007 | Amond, III et al. | |
| 7,469,544 B2 | 12/2008 | Farhangi | |
| 7,578,130 B1 * | 8/2009 | Kraemer | F23R 3/286 60/737 |
| 7,617,682 B2 | 11/2009 | Bruck | |
| 7,841,180 B2 | 11/2010 | Kraemer et al. | |
| 7,841,182 B2 | 11/2010 | Martin | |
| 7,900,456 B2 | 3/2011 | Mao | |
| 8,042,339 B2 * | 10/2011 | Lacy | F23R 3/28 60/737 |
| 8,065,880 B2 | 11/2011 | Ishizaka et al. | |
| 8,079,218 B2 | 12/2011 | Widener | |
| 8,104,291 B2 | 1/2012 | Myers et al. | |
| 8,122,721 B2 | 2/2012 | Johnson et al. | |
| 8,205,452 B2 * | 6/2012 | Boardman | F23R 3/12 60/737 |
| 8,234,871 B2 * | 8/2012 | Davis, Jr. | F23R 3/286 60/737 |
| 8,240,151 B2 | 8/2012 | Pelletier et al. | |
| 8,266,912 B2 | 9/2012 | Berry et al. | |
| 8,276,385 B2 | 10/2012 | Zuo et al. | |
| 8,327,642 B2 | 12/2012 | Uhm et al. | |
| 8,402,763 B2 | 3/2013 | Mulherin et al. | |
| 8,424,311 B2 | 4/2013 | York et al. | |
| 8,438,853 B2 | 5/2013 | Green et al. | |
| 8,505,304 B2 * | 8/2013 | Myers | F23R 3/283 60/737 |
| 8,528,334 B2 | 9/2013 | Dutta et al. | |
| 8,528,336 B2 | 9/2013 | Cihlar et al. | |
| 8,528,839 B2 | 9/2013 | Bailey et al. | |
| 8,572,979 B2 | 11/2013 | Smith et al. | |
| 8,616,002 B2 | 12/2013 | Kraemer et al. | |
| 8,800,289 B2 | 8/2014 | Johnson et al. | |
| 8,850,821 B2 * | 10/2014 | Khan | F23R 3/14 60/737 |
| 8,899,049 B2 | 12/2014 | Krull et al. | |
| 8,919,127 B2 | 12/2014 | Melton et al. | |
| 8,938,978 B2 | 1/2015 | Bailey et al. | |
| 9,163,839 B2 | 10/2015 | Westmoreland et al. | |
| 9,255,711 B2 * | 2/2016 | Crothers | F02C 7/228 |
| 2001/0052229 A1 * | 12/2001 | Tuthill | F23C 7/004 60/776 |
| 2002/0014078 A1 | 2/2002 | Mandai et al. | |
| 2002/0119412 A1 | 8/2002 | Loving | |
| 2002/0128790 A1 | 9/2002 | Woodmansee | |
| 2002/0192615 A1 | 12/2002 | Moriya et al. | |
| 2003/0014975 A1 | 1/2003 | Nishida et al. | |
| 2003/0037549 A1 | 2/2003 | Mandai et al. | |
| 2003/0089801 A1 | 5/2003 | Saitoh et al. | |
| 2004/0000146 A1 * | 1/2004 | Inoue | F02C 7/22 60/776 |
| 2004/0006990 A1 | 1/2004 | Stuttaford et al. | |
| 2004/0006991 A1 | 1/2004 | Stuttaford et al. | |
| 2004/0006992 A1 | 1/2004 | Stuttaford et al. | |
| 2004/0006993 A1 | 1/2004 | Stuttaford et al. | |
| 2004/0060297 A1 | 4/2004 | Koenig et al. | |
| 2004/0142294 A1 | 7/2004 | Niass et al. | |
| 2004/0163392 A1 * | 8/2004 | Nishida | F23R 3/002 60/737 |
| 2007/0289305 A1 | 12/2007 | Oda et al. | |
| 2008/0053097 A1 * | 3/2008 | Han | F23R 3/286 60/737 |
| 2008/0078179 A1 | 4/2008 | Cai | |
| 2008/0163627 A1 | 7/2008 | Elkady et al. | |
| 2009/0241547 A1 | 10/2009 | Luts et al. | |
| 2009/0280443 A1 | 11/2009 | Carroni et al. | |
| 2010/0064691 A1 | 3/2010 | Laster et al. | |
| 2010/0089065 A1 | 4/2010 | Tuthill | |
| 2010/0192583 A1 | 8/2010 | Cano Wolff et al. | |
| 2010/0192586 A1 | 8/2010 | Terada et al. | |
| 2010/0205970 A1 * | 8/2010 | Hessler | F23R 3/343 60/734 |
| 2010/0236252 A1 | 9/2010 | Huth | |
| 2010/0263384 A1 | 10/2010 | Chila | |
| 2010/0293955 A1 * | 11/2010 | Berry | F23R 3/286 60/742 |
| 2010/0313568 A1 * | 12/2010 | Davis, Jr. | F23R 3/002 60/725 |
| 2011/0005230 A1 * | 1/2011 | Bailey | F02C 7/22 60/738 |
| 2011/0016866 A1 * | 1/2011 | Boardman | F23R 3/36 60/730 |
| 2011/0023493 A1 * | 2/2011 | Jain | F23R 3/286 60/747 |
| 2011/0107764 A1 * | 5/2011 | Bailey | F01D 25/28 60/737 |
| 2011/0113783 A1 * | 5/2011 | Boardman | F23C 13/06 60/723 |
| 2011/0179795 A1 * | 7/2011 | Johnson | F23R 3/28 60/725 |
| 2011/0197591 A1 | 8/2011 | Valeev et al. | |
| 2011/0209481 A1 | 9/2011 | Simmons | |
| 2012/0047902 A1 | 3/2012 | Tuthill | |
| 2012/0073302 A1 | 3/2012 | Myers et al. | |
| 2012/0180487 A1 | 7/2012 | Uhm et al. | |
| 2012/0180488 A1 * | 7/2012 | Bailey | F23K 5/14 60/739 |
| 2012/0227371 A1 | 9/2012 | Johnson et al. | |
| 2012/0324896 A1 | 12/2012 | Kim et al. | |
| 2013/0067920 A1 | 3/2013 | Fox et al. | |
| 2013/0074503 A1 | 3/2013 | Rohrssen et al. | |
| 2013/0104554 A1 | 5/2013 | Bode et al. | |
| 2013/0125549 A1 | 5/2013 | Bailey et al. | |
| 2013/0180256 A1 | 7/2013 | Stoia | |
| 2013/0232977 A1 | 9/2013 | Siddagangaiah et al. | |
| 2014/0033718 A1 * | 2/2014 | Manoharan | F23R 3/10 60/725 |
| 2014/0033722 A1 | 2/2014 | Abdel-Hafez et al. | |
| 2014/0053528 A1 * | 2/2014 | Crothers | F23R 3/18 60/39.37 |
| 2014/0109587 A1 * | 4/2014 | Crothers | F02C 7/22 60/776 |
| 2014/0245738 A1 * | 9/2014 | Crothers | F02C 7/228 60/725 |

(56) References Cited

U.S. PATENT DOCUMENTS

| | | | |
|---|---|---|---|
| 2014/0260259 A1* | 9/2014 | Ginesin | F23R 3/346 60/733 |
| 2014/0260267 A1 | 9/2014 | Melton et al. | |
| 2014/0260268 A1 | 9/2014 | Westmoreland et al. | |
| 2014/0260299 A1 | 9/2014 | Boardman et al. | |
| 2014/0260315 A1* | 9/2014 | Westmoreland | F02C 7/20 60/796 |
| 2014/0283522 A1* | 9/2014 | Boardman | F23R 3/286 60/772 |
| 2014/0338338 A1 | 11/2014 | Chila et al. | |
| 2014/0338339 A1* | 11/2014 | Westmoreland | F23R 3/12 60/737 |
| 2014/0338340 A1* | 11/2014 | Melton | F23D 14/62 60/738 |
| 2014/0367495 A1 | 12/2014 | Monaghan et al. | |
| 2015/0000285 A1* | 1/2015 | Deiss | F02C 7/22 60/740 |
| 2015/0059353 A1* | 3/2015 | Asai | F02C 3/22 60/778 |
| 2015/0165568 A1* | 6/2015 | Means | B23P 6/002 29/402.06 |
| 2016/0040883 A1* | 2/2016 | Asai | F23R 3/002 60/737 |
| 2016/0060154 A1 | 3/2016 | Cowles et al. | |

OTHER PUBLICATIONS

U.S. Appl. No. 13/797,883, filed Mar. 12, 2013, Melton et al.
U.S. Appl. No. 13/797,896, filed Mar. 12, 2013, Westmoreland et al.
U.S. Appl. No. 13/797,912, filed Mar. 12, 2013, Chila et al.
U.S. Appl. No. 13/797,925, filed Mar. 12, 2013, Westmoreland et al.
U.S. Appl. No. 13/797,961, filed Mar. 12, 2013, Westmoreland et al.
U.S. Appl. No. 13/797,986, filed Mar. 12, 2013, Chila et al.
U.S. Appl. No. 13/798,012, filed Mar. 12, 2013, Melton et al.
U.S. Appl. No. 13/798,027, filed Mar. 12, 2013, Westmoreland et al.
U.S. Appl. No. 13/400,248, filed Feb. 20, 2012, Westmoreland et al.
U.S. Appl. No. 13/705,443, filed Dec. 5, 2012, Belsom et al.

* cited by examiner

FUEL-AIR MIXING SYSTEM WITH MIXING CHAMBERS OF VARIOUS LENGTHS FOR GAS TURBINE SYSTEM

BACKGROUND

The subject matter disclosed herein relates generally to turbine combustors, and, more particularly to premixing turbine combustors.

Gas turbine systems generally include a compressor, a combustor, and a turbine. The compressor compresses air from an air intake, and subsequently directs the compressed air to the combustor. In the combustor, the compressed air received from the compressor is mixed with a fuel and is combusted to create combustion gases. The combustion gases are directed into the turbine. In the turbine, the combustion gases pass across turbine blades of the turbine, thereby driving the turbine blades, and a shaft to which the turbine blades are attached, into rotation. The rotation of the shaft may further drive a load, such as an electrical generator, that is coupled to the shaft. Conventional gas turbine systems may suffer from various instabilities, such as large amplitude oscillations of pressure, heat release, and/or velocity of constituents within the combustor. Such large amplitudes may result in enhanced thermal stresses within the combustor, as well as increased flame holding and/or inefficient combustion, for example. Thus, there remains a need for a gas turbine system with increased stability.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a premixing system for a gas turbine engine is provided. The system has a plurality of fuel injectors and a plurality of mixing tubes. Each mixing tube includes a first portion configured to receive one of the plurality of fuel injectors and a second portion having a mixing chamber configured to mix fuel and air. The length of each mixing chamber varies among the plurality of mixing tubes.

In a second embodiment, a gas turbine system includes a combustor. The combustor further includes a combustion chamber, a plurality of fuel injectors, and a plurality of mixing tubes. Each mixing tube has a first portion for receiving one of the plurality of fuel injectors and a second portion having a mixing chamber configured to mix fuel and air. The length of the mixing chamber varies among the plurality of mixing tubes.

In a third embodiment, a method includes receiving air into a plurality of mixing chambers, wherein each of the plurality of mixing chambers is within one of a plurality of mixing tubes. The method further includes depositing fuel from a plurality of fuel injectors into the plurality of mixing chambers, wherein each of the plurality of fuel injectors is positioned within one of the plurality of mixing tubes. The air and fuel are mixed within each of the plurality of mixing chambers, such that air-fuel mixing within a first mixing chamber of the plurality of mixing chambers is longer in duration than air-fuel mixing within a second mixing chamber of the plurality of mixing chambers.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Gas turbine engines may include components for premixing fuel and air prior to combustion within a combustion chamber. Some of these premixing systems have a plurality of mixing tubes (e.g., 10 to 1000 mixing tubes), wherein each mixing tube is paired with a fuel injector. In certain embodiments, each mixing tube may have a diameter of less than approximately 1, 2, 3, 4, or 5 centimeters. For example, each mixing tube may have a diameter between approximately 0.5 to 2, 0.75 to 1.75, or 1 to 1.5 centimeters. In certain embodiments, the fuel injector injects fuel axially into the mixing tube, while pressurized air is transferred radially into the mixing tube. Advantageously, such premixing systems may be configured to provide a plurality of mixing tubes having premixing chambers of various lengths, resulting in various mixing times. Thus, the described embodiments are directed to a premixing combustor having a plurality of mixing tubes having a plurality of mixing chambers of one or more different lengths, such that the system has one or more different fuel-air mixing times (or taus). Different mixing times among the plurality of mixing chambers may provide increased stability within the combustor, as described further below.

Figure 1:
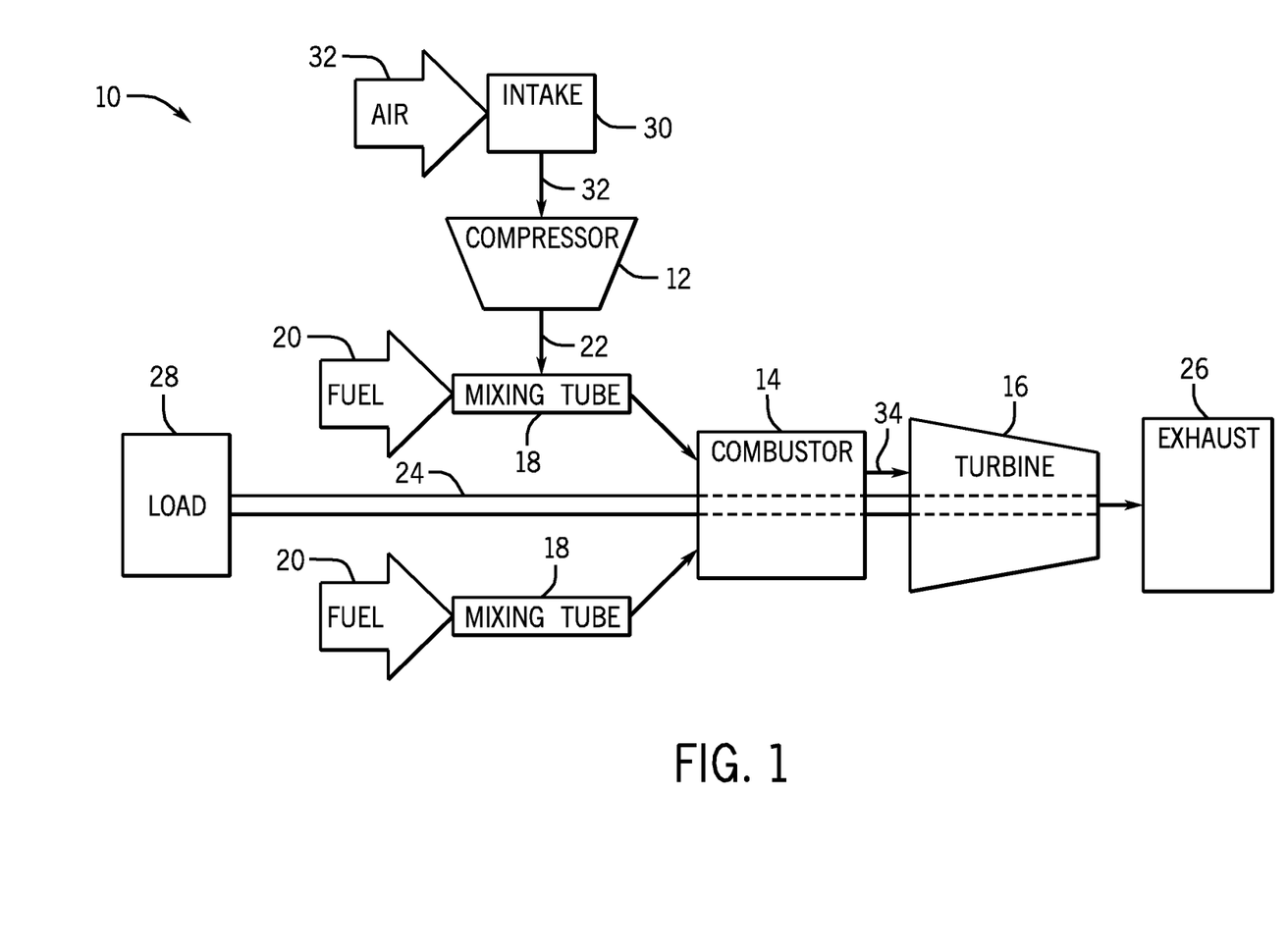
FIG. 1 is a schematic of an embodiment of a gas turbine system with a plurality of mixing tubes.

Turning to the drawings, FIG. 1 illustrates a block diagram of an embodiment of a gas turbine system 10. As shown, the system 10 includes a compressor 12, a turbine combustor 14, and a turbine 16. The turbine combustor 14 may include one or more mixing tubes 18 (e.g., 10 to 1000 mixing tubes) configured to receive both fuel 20 and pressurized oxidant 22, such as air, oxygen, oxygen-enriched air, oxygen reduced air, or any combination thereof. Although the following discussion refers to air as the oxidant 22, any suitable oxidant may be used with the disclosed embodiments. Again, the mixing tubes may be described as micromixing tubes, which may have diameters between approximately 0.5 to 2, 0.75 to 1.75, or 1 to 1.5 centimeters. The mixing tubes 18 may be arranged in one or more bundles of closely spaced tubes, generally in a parallel arrangement relative to one another. In this configuration, each mixing tube 18 is configured to mix (e.g., micromix) on a relatively small scale within each mixing tube 18, which ten outputs a fuel-air mixture into the combustion chamber. In certain embodiments, the system 10 may use a liquid fuel and/or gas fuel 20, such as natural gas or syngas.

Compressor blades are included as components of the compressor 12. The blades within the compressor 12 are coupled to a shaft 24, and will rotate as the shaft 24 is driven to rotate by the turbine 16, as described below. The rotation of the blades within the compressor 12 compresses air 32 from an air intake 30 into pressurized air 22. The pressurized air 22 is then fed into the mixing tubes 18 of the turbine combustors 14. The pressurized air 22 and fuel 20 are mixed within the mixing tubes 18 to produce a suitable fuel-air mixture ratio for combustion (e.g., a combustion that causes the fuel to more completely burn so as not to waste fuel 20 or cause excess emissions).

The turbine combustors 14 ignite and combust the fuel-air mixture, and then pass hot pressurized combustion gasses 34 (e.g., exhaust) into the turbine 16. Turbine blades are coupled to the shaft 24, which is also coupled to several other components throughout the turbine system 10. As the combustion gases 34 flow against and between the turbine blades in the turbine 16, the turbine 16 is driven into rotation, which causes the shaft 24 to rotate. Eventually, the combustion gases 34 exit the turbine system 10 via an exhaust outlet 26. Further, the shaft 24 may be coupled to a load 28, which is powered via rotation of the shaft 24. For example, the load 28 may be any suitable device that may generate power via the rotational output of the turbine system 10, such as an electrical generator, a propeller of an airplane, and so forth.

Figure 2:
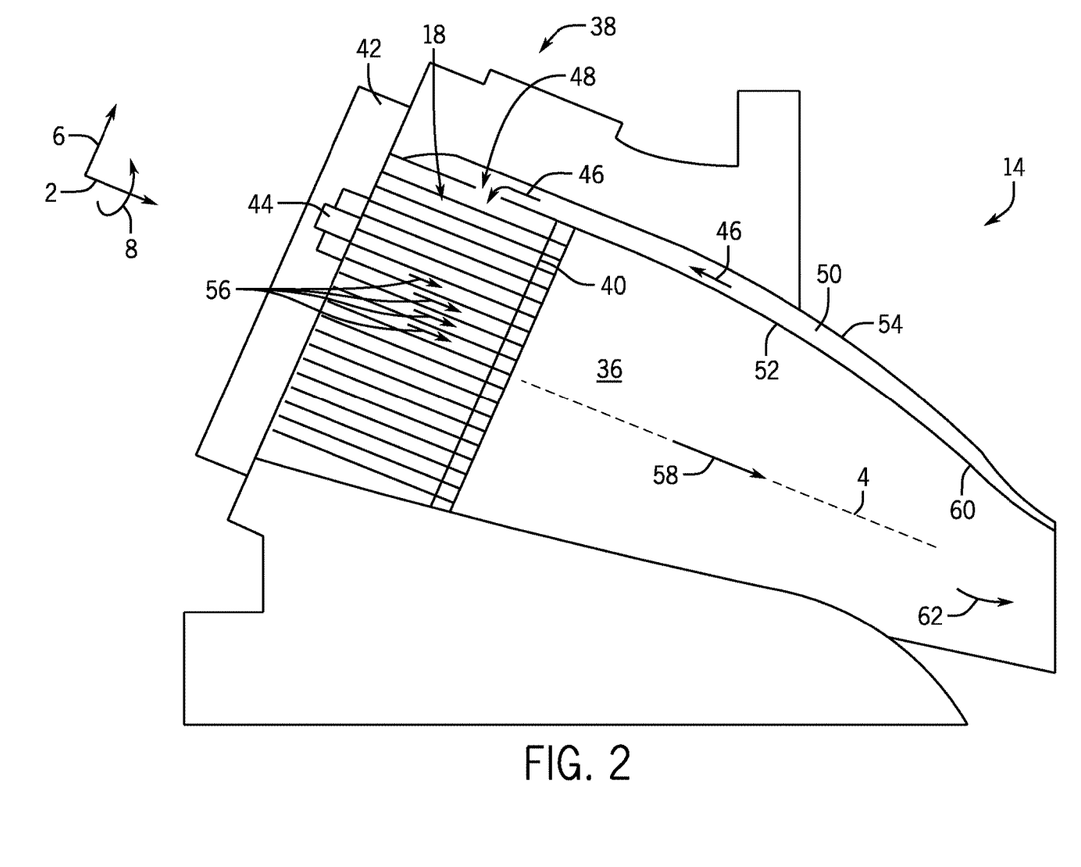
FIG. 2 is a cross-sectional side view schematic of an embodiment of a turbine combustor, illustrating the plurality of mixing tubes positioned within a head end of the combustor.

FIG. 2 is a cross-sectional schematic of an embodiment of the combustor 14 of FIG. 1. As shown, the combustor 14 includes a combustion chamber 36 and a head end 38. A plurality of mixing tubes 18 are positioned within the head end 38 of the combustor 14. The mixing tubes 18 may generally extend between a cap 40 and an end cover 42. In some embodiments, the mixing tubes 18 are suspended in the head end 38, such that the mixing tubes 18 are not be attached to the end cover 42 or the cap 40. Alternatively, however, the mixing tubes 18 may be coupled to at least one of the cap 40 or the end cover 42, as further described below. The end cover 42 may also include a fuel plenum 44 for providing fuel to the mixing tubes 18. In the following discussion, reference may be made to an axial direction 2, along an axis 4 of the combustor 14, a radial direction 6 away from or toward the axis 4, and a circumferential direction 8 around the axis 4. The mixing tubes 18 extend in the axial direction 2 and are generally parallel to one another. The fuel plenum 44 routes fuel to the mixing tubes 18 in the axial direction 2 whereas the mixing tubes 18 receive air in the radial direction 6.

As described above, the compressor 12 receives air 32 from the air intake 30, compresses the air 32, and produces the flow of pressurized air 22 for use in the combustion process. As shown by arrow 46, the pressurized air 22 is provided to the head end 38 of the combustor 14 through an air inlet 48, which directs the air laterally or radially 6 towards side walls of the mixing tubes 18. More specifically, the pressurized air 22 flows in the axial direction 2 indicated by arrow 46 from the compressor 12 through an annulus 50 between a liner 52 and a flow sleeve 54 of the combustor 14 to reach the head end 38. The liner 52 is positioned circumferentially about combustion chamber 36, the annulus 50 is positioned circumferentially about liner 52, and the flow sleeve 54 is positioned circumferentially about annulus 50. Upon reaching the head end 38, the air 22 turns from the axial direction 2 to the radial direction 6 through the inlet 48 toward the mixing tubes 18, as indicated by arrows 46.

The pressurized air 22 is mixed with the fuel 20 within the plurality of mixing tubes 18. As discussed below, each mixing tube 18 received the fuel 20 in the axial direction 2 through an axial end portion of the mixing tube 18, while also receiving the air 22 through a plurality of side openings in the mixing tube 18. Thus, the fuel 20 and the air 22 mix within each individual mixing tube 18. As shown by arrows 56, the fuel-air mixture flows downstream within the mixing tubes 18 into the combustion chamber 36 where the fuel-air mixture is ignited and combusted to form the combustion gases 34 (e.g., exhaust). The combustion gases 34 flow in a direction 58 toward a transition piece 60 of the turbine combustor 14. The combustion gases 34 pass through the transition piece 60, as indicated by arrow 62, toward the turbine 16, where the combustion gases 34 drive the rotation of the blades within the turbine 16.

Figure 3:
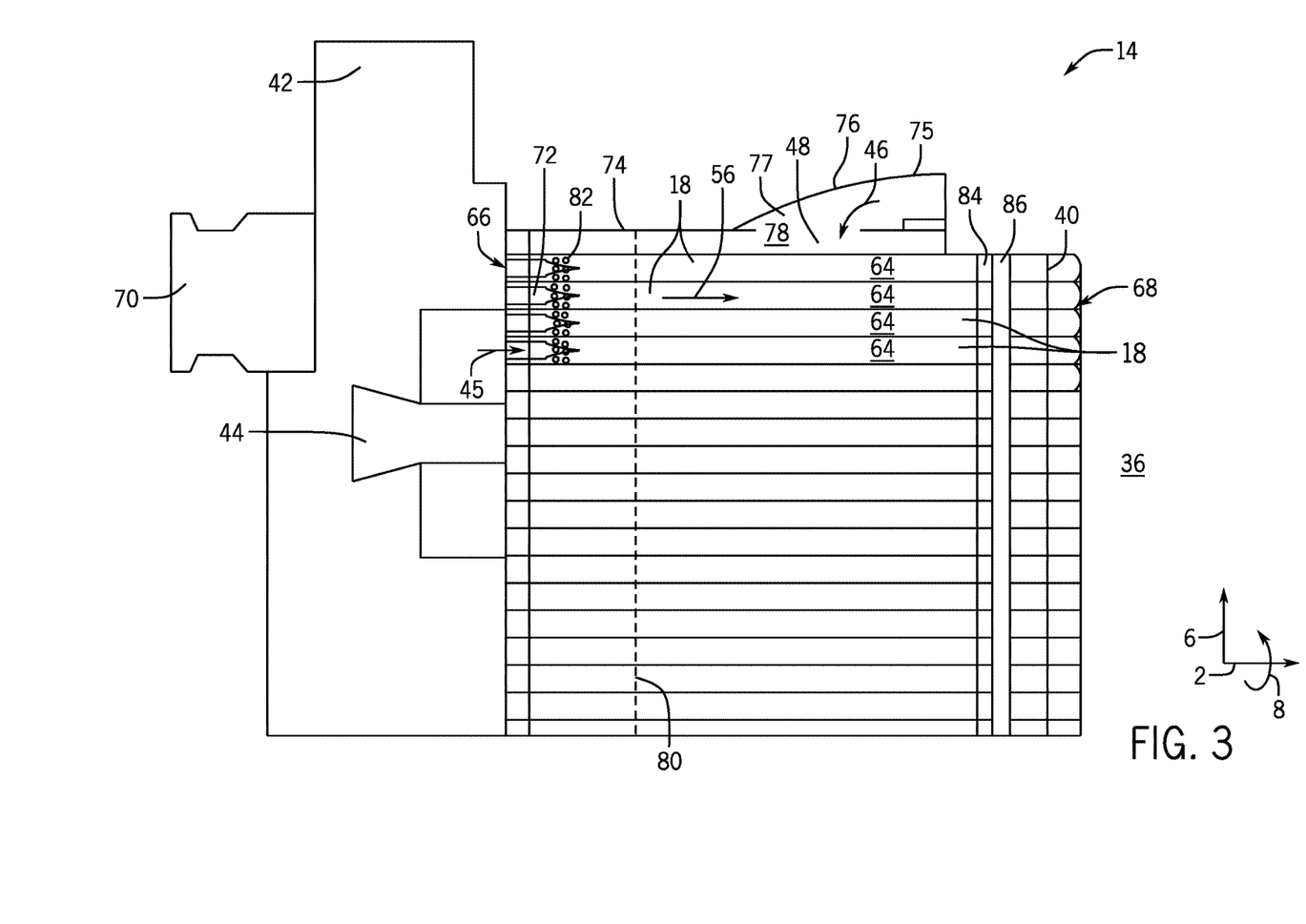
FIG. 3 is a cross-sectional side view schematic of an embodiment of the turbine combustor of FIG. 2, illustrating the plurality of mixing tubes and a plurality of fuel injectors.

FIG. 3 is a schematic illustration of the plurality of mixing tubes 18 within the combustor 14. As shown, each mixing tube 18 has a passage or mixing chamber 64 formed therein. The mixing chamber 64 is configured to receive and to mix the fuel 20 and pressurized air 22. As illustrated, the mixing tube 18 generally extends between a first end 66 (e.g., axial end opening) and a second end 68 (e.g., axial end opening) of the mixing tube 18, and the mixing chamber 64 is formed within a portion of the mixing tube 18 such that that the mixing chamber 64 is shorter in length than its respective mixing tube 18. The mixing chamber 64 and its respective mixing tube 18 may extend through the cap 40 (e.g., perforated cap) so that the fuel-air mixture may be output from the mixing chamber 64 into the combustion chamber 36 through an axial end opening generally located proximate to the second end 68 of the mixing tube 18. The cap 40 may include a plurality of openings or receptacles, which receive and support the plurality of mixing tubes 18. In certain embodiments, the mixing tube 18 may be attached to the cap 40 and/or to the end cover 42 via a braze, weld, threads, brackets, clamps, or interference fits. However, in some embodiments, the mixing tube is not fixedly attached to the end cover 42 or to the cap 40. Furthermore, the mixing tube 18 may not be permanently attached to any components within the combustor 14. Rather, the mixing tube 18 may be floating or suspended within the head end 38, e.g., supported by one or more structures (e.g., the cap 40, a retainer, an impingement plate, a spring, etc.) within the combustor 14. Such supporting structures may generally provide axial constraint to the mixing tube 18, while also enabling axial movement in response to movement, vibration, thermal expansion or contraction, or any combination thereof.

In some embodiments, each mixing tube 18 and its respective mixing chamber 64 may have a generally circular cross-sectional shape. Additionally, each mixing tube 18 and its respective mixing chamber 64 may have a diameter of less than approximately 1, 2, 3, 4, or 5 centimeters. In certain embodiments, each mixing tube 18 and its respective mixing chamber 64 may have a diameter between approximately 0.5 to 2, 0.75 to 1.75, or 1 to 1.5 centimeters. It should be understood that all mixing tubes 18 and/or mixing chambers 64 within the combustor 14 may have a substantially similar diameter, but that in certain embodiments it may be advantageous for the mixing tubes 18 and/or mixing chambers 64 to have a variety of diameters. Furthermore, each mixing tube 18 and mixing chamber 64 may have a length of from approximately 1 centimeter to approximately 75 centimeters, in some typical embodiments. In certain embodiments, each mixing tube 18 and mixing chamber 64 may have a length of approximately 10 to 60, 15 to 50, 20 to 40, or 30 to 35 centimeters. In certain embodiments, all of the mixing tubes 18 within the combustor 14 may have substantially similar lengths (e.g. within approximately 5%), although in some embodiments the mixing tubes 18 may have two or more different lengths. In embodiments of the present disclosure, the mixing chambers 64 within the combustor 14 have two or more different lengths in order to provide a plurality of different mixing times, as discussed further below.

In some embodiments, the end cover 42 may be positioned upstream of, and proximate to, the first end 66 of the mixing tube 18. The end cover 42 may include one or more fuel inlets 70 through which the fuel 20 is provided to one or more fuel plenums 44 (e.g., 1, 2, 3, 4, 5, 6, 7, 8, 9, 10, or more) within the end cover 42. Furthermore, each fuel plenum 44 may be fluidly connected to one or more fuel injectors 72 (e.g., 1, 2, 3, 4, 5, 6, 7, 8, 9, 10, or more). As illustrated, each mixing tube 18 includes a respective fuel injector 72, which receives the fuel 20 in the axial direction 2 as indicated by arrows 45. In some embodiments, the end cover 42 may include a single common fuel plenum 44 (e.g., fuel supply chamber) for all of the mixing tubes 18 and associated fuel injectors 72. In other embodiments, the system 10 may include one, two, three, or more fuel plenums 44 that each provides fuel 20 to a subgroup of fuel injectors 72, and ultimately to the mixing tube 18 associated with each fuel injector 72. For example, one fuel plenum 44 may provide fuel to about 5, 10, 50, 70, 100, 500, 1000, or more fuel injectors 72. In some embodiments, the combustor 14 having subgroups of fuel injectors 72 supplied by different fuel plenums 44 may allow one or more subgroups of fuel injectors 72 and corresponding mixing tubes 18 to be run richer or leaner than others, which in turn may allow for more control of the combustion process, for example. Additionally, multiple fuel plenums 44 may enable the use of multiple types of fuel 20 (e.g., at the same time) with the combustor 14.

As shown in FIG. 3, a support structure 74 (e.g., side wall) may circumferentially surround the head end 38 of the combustor 14, and the support structure 74 may generally protect and/or support the mixing tubes 18 and other structures within the head end 38. For example, the support structure 74 may be an outer annular wall. As described above, in some embodiments, pressurized air 22 may enter the head end 38 through an air inlet 48. More specifically, pressurized air 22 may flow through the air inlet 48 laterally into an air cavity 78 within the head end 38, e.g., in a generally radial direction 6 as indicated by arrow 46. The air cavity 78 includes the volume of space within the head end 38 between the plurality of mixing tubes 18 and surrounded by the support structure 74 (e.g., outer wall). The pressurized air 22 spreads throughout the air cavity 78 as the pressurized air 22 flows to each of the plurality of mixing tubes 18. In some embodiments, a flow distributor or diffuser 76 (e.g., a baffle, conduit, or turning vane) may be provided in the combustor 14. The diffuser 76 may be an annular flow conditioning diffuser configured to distribute the pressurized air 22 forward, radially 6 inward, and/or externally across the plurality of mixing tubes 18. For example, the diffuser 76 may include a tapered annular wall 75, which gradually angles or curves inwardly toward the cavity 78 and mixing tubes 18 in the radial direction 6. The diffuser 76 also may include an annular internal passage 77, which generally diverges or grows in cross-sectional area toward the cavity 78 and the mixing tubes 18. The diffuser 76 may be configured to improve distribution of the pressurized air 22 within the head end 38. In some embodiments, the diffuser 76 may diffuse the pressurized air 22 such that the pressurized air 22 is substantially evenly distributed to each mixing tube 18. Additionally or alternatively, a perforated air distribution plate 80, indicated by a dashed line in FIG. 3, may be provided within the cavity 78 of the head end 38, and the air distribution plate 80 may generally be positioned between the end cover 42 and the cap 40. The perforations in the air distribution plate 80 may be of any of a variety of shapes and sizes, and may generally provide additional diffusion and distribution of the pressurized air 22, so as to improve distribution of the pressurized air 22 to the mixing tubes 18.

After entering the head end 38 through the air inlet 48, the pressurized air 22 may enter each mixing tube 18 and its respective mixing chamber 64 through one or more apertures 82 formed in the mixing tubes 18. The apertures 82 may be configured to have any of a variety of shapes, sizes, and arrangements. For example, the apertures 82 may be generally circular, elliptical, or rectangular in cross-sectional shape. The apertures 82 may further have a diameter or a dimension in the range of from approximately 0.001 centimeters to approximately 1.5 or more centimeters. The apertures 82 may also have a diameter or dimension in the range of from approximately 0.01 to 1, 0.05 to 0.5, or 0.1 to 0.25 centimeters, for example. In some embodiments, one or more rows of apertures 82 may be spaced (e.g., evenly) around the circumference of the mixing tube 18. Furthermore, the apertures 82 may be positioned at an angle with respect to the mixing tube 18. In other words, the apertures 82 may be configured such that of the pressurized air 22 passes through the aperture 82 and flows into the mixing chamber 64 of the mixing tube 18 at an angle $\alpha_1$ with respect to the wall of the mixing tube 18. In certain embodiments, the angle $\alpha_1$ at which the pressurized air 22 flows into the mixing chamber 64 may be equal to, greater than, or less than 90 degrees. For example, the angle $\alpha_1$ may be approximately 10, 20, 30, 40, 50, 60, 70, or 80 degrees. The apertures 82 formed in the mixing tubes 18 may have substantially similar shapes, sizes, and/or angles, while in other embodiments the apertures 82 may have different shapes, sizes, and/or angles. In general, the apertures 82 may be positioned at any location along the mixing tube 18. However, in some embodiments, the apertures 82 may be positioned generally upstream from the position at which the fuel 20 enters the mixing tube 18 through the fuel injector 72. Furthermore, the apertures 82 may be spaced circumferentially about the fuel injector 72, thereby directing the air 22 radially inward toward the fuel injector 72.

Alternatively, rather than apertures 82, one or more of the mixing tubes 18 may have an expanded diameter at the first end 66 of the mixing tube 18 for receiving the pressurized air 22. In other words, the first end 66 may be expanded so as to have a bell-like shape. In such configurations, the pressurized air 22 may enter the mixing tube 18 through the first end 66 of the mixing tube 18. For example, the pressurized air 22 may be distributed through the inlet 48 axially and/or radially inwardly across the mixing tube 18, and towards the end plate 42. The pressurized air 22 may enter the mixing tube 18 through the first end 66 of the mixing tube 18. In some embodiments, one or more mixing tubes 18 within the combustor 14 may be configured to receive pressurized air 22 through the first end 66 of the mixing tube 18, while one or more mixing tubes 18 may be configured to receive the pressurized air 22 through apertures 82 formed on the wall of the mixing tube 18.

As shown in FIG. 3, in some embodiments, the combustor 14 also has a retainer 84 and/or an impingement plate 86. The retainer 84 and/or the impingement plate 86 may be positioned downstream of the fuel injectors 72 and generally proximate to the cap 40. In some embodiments, the cap 40, the retainer 84, and/or the impingement plate 86 may be removable or separable from the support structure 74, for example. The retainer 84 may provide support for the mixing tubes 18. The impingement plate 86 may be positioned substantially adjacent to a cap 40, and in some embodiments, the impingement plate 86 may be positioned between the retainer 84 and the cap 40. The impingement plate 86 may support the mixing tubes 18, and may additionally or alternatively provide for cooling of the cap 40 within the combustor 14.

As discussed above and as shown in FIG. 3, one fuel injector 72 is provided for each mixing tube 18 of the combustor 14. In other words, one fuel injector 72 is positioned within a portion of each mixing tube 18 in order to deliver fuel 20 into the mixing chamber 64 of each mixing tube 18. In some embodiments, the fuel injector 72 may be generally coaxially positioned within each mixing tube 18 by inserting the fuel injector 72 axially 2 through the first end 66 of each mixing tube 18. In certain embodiments, the mixing tubes 18 may have a size, shape, and configuration that enable each mixing tube 18 to receive the corresponding fuel injector 72.

Figure 4:
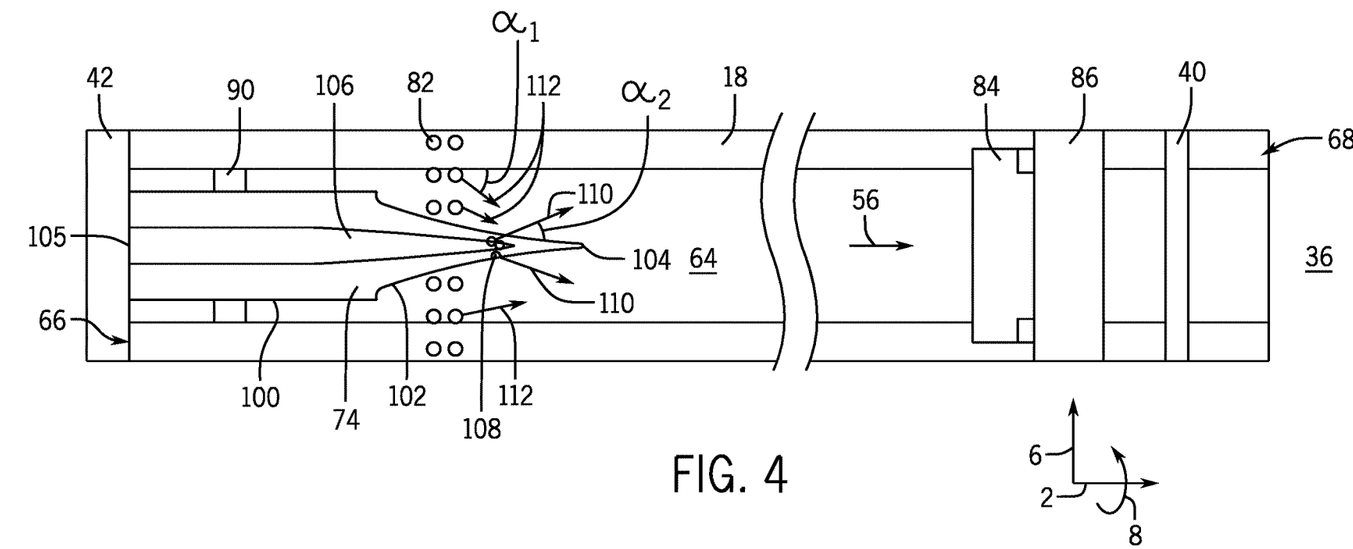
FIG. 4 is a cross-sectional side view schematic of an embodiment of one mixing tube including a fuel injector.

Referring to FIG. 4, each fuel injector 72 may be removeably coupled to the end cover 42. Together, the end cover 42 and the fuel injectors 72 may be described as a fuel injector assembly or module. While the fuel injectors 72 are coupled to the end cover 42 as a fuel injector assembly or module, the mixing tubes 18 may be supported within the support structure 74 as a mixing tube assembly or module. Thus, the fuel injector module and the mixing tube module enable quick and simple assembly of all mixing tubes 18 and associated fuel injectors 72 by assembling these two modules with one another.

In some embodiments, the fuel injector 72 may generally extend from a shoulder 100 (e.g., first tubular portion) to an end portion 102 (e.g., second tubular portion). In certain embodiments, the shoulder 100 may have a larger diameter than the end portion 102, and the end portion 102 may be tapered (e.g., a tapered annular shape, such as a conical shape) such that the diameter gradually decreases from the shoulder 100 to a distal end 104 of the end portion 102. In certain embodiments, the end portion 102 may form a spike, or generally come to a point at the distal end 104, as shown in FIG. 4. Other shapes and configurations of the end portion 102 of the fuel injector 72 are envisioned, such as, an end portion 102 having a cylindrical shape, rectangular shape, or a hexagonal shape, for example. Additionally, the fuel injectors 72 may be configured to have any of a variety of suitable lengths, and may further have various shoulder 100 lengths and end portion 102 lengths. For example, in some embodiments, each fuel injector 72 may have a length of from approximately 0.1 centimeters to approximately 25, or more, centimeters. In some embodiments, the fuel injector 72 may have a length of approximately 2 to 15, 4 to 10, or 5 to 8 centimeters. Furthermore, in some embodiments, the fuel injectors 72 within the combustor 14 may have substantially similar lengths, although in other embodiments, the fuel injectors 72 may have two or more different lengths (e.g., 2, 3, 4, 5, 6, 7, 8, 9, 10, or more different lengths). Additionally, the ratio between a length of the shoulder 100 and a length of the end portion 102 may be approximately 1:1. Although, in other embodiments, the ratio may be approximately 2:1 or 1:2, 3:1 or 1:3, 4:1 or 1:4 or any other suitable ratio, for example. In some embodiments, a spring 90, such as a radial spring, may additionally be provided around a portion of the shoulder 100 of the fuel injector 72 to support the fuel injector 72.

The fuel 20 may pass from the fuel plenum 44 located on or within the end cover 42 through a fuel inlet 105 into a fuel passage 106 within the fuel injector 72. The fuel 20 may exit the fuel passage 106 at one or more holes 108 (e.g., fuel outlets) positioned on the fuel injector 72. The holes 108 may be positioned at any suitable location on the fuel injector 72. For example, in some embodiments, the holes 108 may be positioned on the shoulder 100 of the fuel injector 72. In other embodiments, the holes 108 may be positioned on the end portion 102 of the fuel injector 72. Furthermore, the holes may be positioned on any substantially cylindrical portion of the fuel injector 72, or on any substantially tapered or conical portion of the fuel injector 72.

Additionally, the holes 108 may be configured in any of a variety of ways, and more particularly, the holes 108 may have any of a variety of shapes, angles, and sizes. For example, in some embodiments, the holes 108 may have a substantially circular cross-sectional shape. In some embodiments, one or more of the holes 108 may configured so that the fuel 20 is injected into the mixing chamber 64 of the mixing tube 18 at an angle $\alpha_2$ relative to the wall of the fuel injector 72. For example, the hole 108 may be configured so that the fuel 20 is injected into the mixing chamber 64 at an angle $\alpha_2$ equal to, greater than, or less than 90 degrees with respect to the wall of the fuel injector 72. In other embodiments, the hole 108 may be configured so that the fuel 20 is injected into the mixing chamber 64 at an angle $\alpha_2$ of approximately 10, 20, 30, 40, 50, 60, 70, or 80 degrees with respect to the wall of the fuel injector 72. The holes 108 may be generally configured such that the flame holding characteristics of the combustor improve. Additionally, in some embodiments, the one or more holes 108 may be positioned circumferentially about the fuel injector 72. For example, the holes 108 may be spaced evenly around the circumference of the fuel injector 72. In certain embodiments, the holes 108 may be configured such that the fuel 20 may be radially discharged and spread radially outwardly as indicated by arrows 110 into the mixing chamber 64 of the mixing tube 18. The holes 108 may be substantially the same size, although in other embodiments the holes 108 may have different sizes. In some embodiments having a plurality of holes 108 on each fuel injector 72, the plurality of holes 108 may be configured to have substantially similar sizes, shapes, and/or angles. Alternatively, the plurality of holes 108 may be configured to have one or more different sizes, shapes, and/or angles.

The embodiments described above provide for mixing of fuel 20 and pressurized air 22 before combustion in the combustion chamber 36. As discussed above, the premixing combustor 14 may be configured to have a plurality of different mixing times. Various mixing times among the plurality of mixing tubes 18 may reduce the large amplitude oscillations often present in combustors and may generally reduce the instability within the combustion system, for example. Thus, described below are various configurations and arrangements of the mixing tubes 18, the mixing chambers 64, the fuel injectors 72, the apertures 82, the holes 108, and/or other components within the combustor 14 that may provide for two or more different mixing times.

Figure 5:
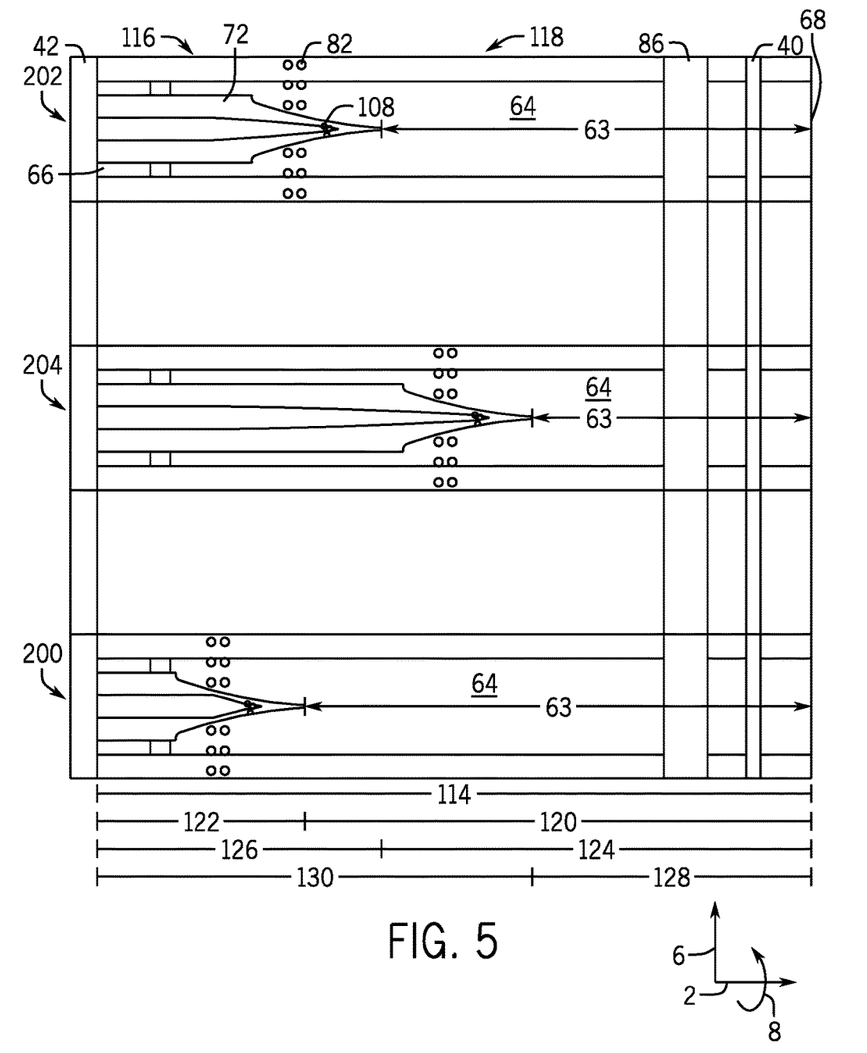
FIG. 5 is a cross-sectional side view schematic of an embodiment of the turbine combustor of FIG. 2, illustrating a plurality of mixing chambers of different lengths.

FIG. 5 illustrates one embodiment of the combustor 14 configured to provide a plurality of different mixing times. As shown in the illustrated embodiment, each mixing tube 18 within the combustor 14 may extend between the first end 64 and the second end 66, and each mixing tube 18 may be of substantially similar length 114. In certain embodiments, each mixing tube 18 may include a first portion 116 for receiving its respective fuel injector 72 and a second portion 118 having the respective mixing chamber 64 for mixing fuel 20 and air 22. As described above, the fuel 20 may be injected into the mixing chamber 64 through the holes 108 of the fuel injector 72 and pressurized air 22 may pass into the mixing chamber 64 through the apertures 82.

Furthermore, as shown in FIG. 5, the plurality of mixing chambers 64 may have a plurality of different lengths 63 to provide a plurality of different mixing times within the combustor 14. The plurality of mixing chambers 64 may be of 2, 3, 4, 5, 6, 7, 8, 9, 10, or more different lengths 63, for example. Such configurations may generally provide for different mixing times, as a relatively short mixing chamber 64 may provide less time for the fuel 20 and pressurized air 22 to mix, while a relatively long mixing chamber 64 may provide more time for the fuel 20 and pressurized air 22 to mix before being deposited into the combustion chamber 36. Additionally, in some embodiments, the plurality of fuel injectors 72 may have a plurality of different lengths 63. The plurality of fuel injectors 72 may be of 2, 3, 4, 5, 6, 7, 8, 9, 10, or more different lengths 63, for example.

More specifically, in the embodiment depicted in FIG. 5, both the plurality of mixing chambers 64 and the plurality of fuel injectors 72 vary in length. In some such embodiments, the length 63 of the mixing chamber 64 and the length of the corresponding fuel injector 72 may generally equate to the total length 114 of the respective mixing tube 18. Thus, the relative length, or ratio of the lengths, of the mixing chamber 64 and the corresponding fuel injector 72 may vary among the plurality of mixing tubes 18 within the combustor 14. In other words, each fuel injector 72 may have a length that generally compensates for, or is compatible with, the length of its corresponding mixing chamber 64.

As shown in FIG. 5, the mixing chamber 64 of one first mixing tube 18 (e.g., a first mixing tube 200) may have a relatively long length 120 and its corresponding fuel injector 72 may have a relatively short length 122, such that the combined lengths of the mixing chamber 64 and fuel injector 72 generally equal the length 114 of the first mixing tube 200. The mixing chamber 64 of another mixing tube 18 (e.g., a second mixing tube 202) may have an average length 124 and its corresponding fuel injector 72 of an average length 126, such that the combined lengths of the mixing tube 64 and fuel injector 72 generally equal the length 114 of the second mixing tube 202. Finally, as depicted, the mixing chamber 64 of yet another mixing tube 18 (e.g., a third mixing tube 204) may have a relatively short length 128 and its corresponding fuel injector 72 may have a relatively long length 130, such that the combined lengths of the mixing tube 64 and fuel injector 72 generally equal the length 114 of the third mixing tube 204. Thus, as explained above, the length of the mixing chamber 64 and the length of the corresponding fuel injector 72 of each mixing tube 18 may vary. The embodiment illustrated in FIG. 5 provides three different mixing chamber 64 lengths, and accordingly, provides three different mixing times for the fuel 20 and air 22 to premix within the mixing tube 18. The ratio between the length of the mixing chamber 64 and its corresponding fuel injector 72 may be any suitable ratio. For example, the ratio of length 120 to 122 may be approximately 50:1, 40:1, 30:1, 20:1, 10:1, 5:1, 4:1, 3:1, or 2:1, or vice versa, for example. Alternatively, the mixing chamber 64 may be shorter than its corresponding fuel injector 72, such that the ratio of length 120 to 122 may be approximately 1:50, 1:40, 1:30, 1:20, 1:10, 1:5, 1:4, 1:2, or vice versa, for example.

Notably, in FIG. 5 the fuel inlets (such as, for example, holes 108) and/or air inlets (such as, for example, apertures 82) associated with each mixing tube 18 lie in a plurality of different planes. Thus, in some embodiments, a system providing a plurality of different mixing times may be created by varying the position of the holes 108 and/or apertures 82 among the plurality of mixing tubes 18. In some embodiments, the position of the holes 108 may be varied as a result of varying the fuel injector 72 length, as in FIG. 4. However, in some embodiments, the position of the holes 108 may be varied as a result of varying the location of the holes 108 on the plurality of fuel injectors 72. For example, as described above, the holes 108 may be located on the shoulder portion 100 or on the end portion 102 of the fuel injector 72. Additionally, in some embodiments, the apertures 82 may be located in different planes, and as a result, the time provided for mixing the fuel 20 and pressurized air 22 may vary within the combustor 14.

Figure 6:
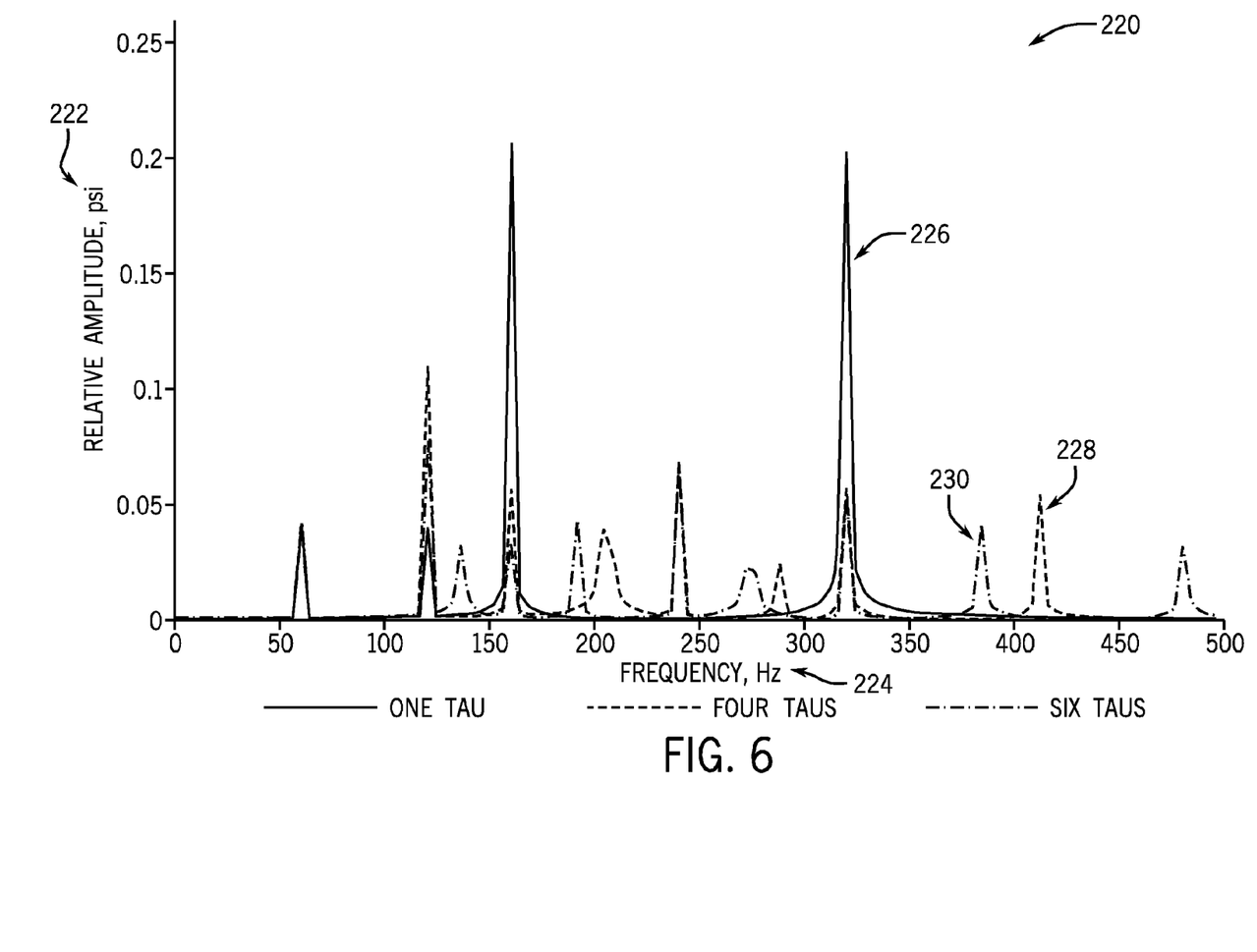
FIG. 6 is a graph depicting the relative amplitude with respect to frequency for three different turbine combustors.

FIG. 6 depicts a graph 220 illustrating the dynamics that may be possible with a system that provides multiple different mixing times among the plurality of mixing tubes 18, in accordance with some of the embodiments described herein. More specifically, the graph 220 illustrates relative amplitude 222 versus frequency 224 for three different mixing systems. A first system 226 illustrated is configured to provide one mixing time, a second system 228 is configured to provide four different mixing times, and a third system 230 is configured to provide six different mixing times among the plurality of mixing tubes 18. As shown, the first system 226 with only one mixing time has the greatest instability, as indicated by the large spikes in amplitude at discrete frequencies. The second system 228 with four different mixing times results in relatively less instability than the first system 226, and the third system 230 having six different mixing times results in the least instability among the depicted models. Instead of high amplitude at one or two frequencies, a system configured to have multiple different mixing times provides for reduced peak amplitude of pressure oscillations at many different frequencies (e.g., 2-100 different frequencies). In other words, the system having a plurality different mixing times for the plurality of mixing tubes attenuates the amplitude by smearing the unsteadiness over many frequencies. Thus, as illustrated, systems configured to provide a plurality of different mixing times may advantageously reduce instability within the combustion system.

While the illustrated embodiments generally show different mixing times in the context of a system having a plurality of mixing chambers 64 of varying length and corresponding fuel injectors 72 of varying length, any construction that provides for different mixing chamber 64 lengths and different fuel-air mixing times is envisioned. It should also be understood that any number of different mixing times may be provided within a combustor 14, in accordance with the present disclosure. In some embodiments, 2, 3, 4, 5, 6, 7, 8, or 9 different premixing times may be provided. In some embodiments, about 10, 15, 20, or more premixing times may be provided. In some embodiments, the different mixing times may be between approximately 0.5 to 50 msec. In some embodiments, the different mixing times in the system may be any combination of mixing times of approximately 1, 1.5, 2, 2.5, 3, 3.5, 4, 4.5, or 5 msec. Additionally, it is envisioned that the various mixing times and the herein described structures configured to provide the various mixing times may also be implemented in other types of combustion systems, and the dimensions may be scaled up or down as appropriate for a particular combustion system.

As described above, some of these premixing systems for gas turbine engines have a plurality of mixing tubes, wherein each mixing tube is paired with a fuel injector. Advantageously, such premixing systems may be configured to provide a plurality of mixing tubes having premixing chambers of various lengths, resulting in various mixing times. Different mixing times among the plurality of mixing tubes may, in turn, provide increased stability within the combustor.

This written description uses examples to disclose the invention, including the best mode, and also to enables any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A premixing system for a gas turbine engine, the premixing system comprising:
   a plurality of fuel injectors;
   a plurality of mixing tubes, each mixing tube comprising:
      an annular wall defining the mixing tube and comprising a plurality of apertures configured to enable air to flow radially into the mixing tube;
      a first portion configured to receive one of the plurality of fuel injectors, wherein the one fuel injector of the plurality of fuel injectors is positioned coaxially within the first portion of the mixing tube; and
      a second portion comprising a mixing chamber configured to mix fuel provided via one or more holes formed in the one fuel injector and the air, wherein the mixing chamber is defined by and extends between a tip of the one fuel injector and a second end of the mixing tube that is configured to deposit the fuel and the air directly into a combustion chamber of the gas turbine engine, wherein the fuel injector having a first end and the tip of the one fuel injector disposed at an opposite downstream end of the one fuel injector and the one or more holes are positioned upstream of the tip of the one fuel injector; wherein a respective length of the respective mixing chamber varies among the plurality of mixing tubes.

2. The system of claim 1, wherein the plurality of mixing tubes are of substantially similar length.

3. The system of claim 2, wherein a ratio between a first length of the first portion and a second length of the second portion varies among the plurality of mixing tubes.

4. The system of claim 1, wherein at least two of the plurality of fuel injectors have different lengths.

5. The system of claim 1, wherein the plurality of apertures formed on the respective annular wall of a first mixing tube of the plurality of mixing tube are the only apertures formed on the respective annular wall of the first mixing tube of the plurality of mixing tubes that are configured to enable air to flow radially into the first mixing tube, the plurality of apertures formed on the respective annular wall of the first mixing tube are positioned a first distance away from a first outlet of the first mixing tube, and the plurality of apertures formed on the respective annular wall of a second mixing tube of the plurality of mixing tubes are the only apertures formed on the respective annular wall of the second mixing tube of the plurality of mixing tubes that are configured to enable air to flow radially into the second mixing tube, and the plurality of apertures formed on the respective annular wall of the second mixing tube are positioned a second distance away from a second outlet of the second mixing tube, wherein the first and second distances are different.

6. The system of claim 5, wherein each of the plurality of fuel injectors comprises one or more holes configured to inject fuel directly into the respective mixing tube, and the respective one or more holes of a first fuel injector of the plurality of fuel injectors are the only holes formed in the first fuel injector that are configured to inject fuel directly into the first mixing tube, the respective one or more holes of the first fuel injector are positioned at a third distance from the first outlet of the first mixing tube, the respective one or more holes of a second fuel injector of the plurality of fuel injectors are the only holes formed in the second fuel injector that are configured to inject fuel directly into the second mixing tube, and the respective one or more holes of the second fuel injector are positioned at a fourth distance from the second outlet of the second mixing tube, and the third and fourth distances are different.

7. The system of claim 1, wherein the respective second ends of each of the plurality of mixing tubes are substantially aligned in a plane.

8. The system of claim 1, wherein the plurality of apertures are positioned upstream of the one or more holes.

9. The system of claim 1, wherein the plurality of apertures are the only apertures formed on the annular wall of each mixing tube that are configured to enable air to flow radially into each mixing tube, the one or more holes are the only holes formed in the one fuel injector, and an axial distance between the plurality of apertures and the one or more holes is constant among the plurality of mixing tubes.

10. The system of claim 1, wherein a respective axial distance between the tip and the one or more holes is constant among the plurality of fuel injectors.

11. A gas turbine system comprising:
    a combustor comprising:
       a combustion chamber;
       a plurality of fuel injectors;

a plurality of mixing tubes, each mixing tube comprising:
  an annular wall defining the mixing tube and comprising a plurality of apertures configured to enable air to flow radially into the mixing tube, wherein the plurality of apertures are positioned in a section of the annular wall that extends along part of an axial length of the annular wall and the remainder of the annular wall outside of the section is devoid of apertures that are configured to enable air to flow radially into the mixing tube;
  a first portion configured to receive one of the plurality of fuel injectors; and
  a second portion downstream of the first portion and comprising a mixing chamber configured to mix fuel provided by the one fuel injector of the plurality of fuel injectors and the air;
wherein the respective mixing chamber of a first mixing tube of the plurality of mixing tubes has a different length than the respective mixing chamber of a second mixing tube of the plurality of the mixing tubes;
wherein the respective section of the first mixing tube is positioned a first distance away from the combustion chamber, and the respective section of the second mixing tube is positioned a second distance away from the combustion chamber, and the first and second distances are different from one another.

12. The system of claim 11, wherein the plurality of mixing tubes are of substantially similar length.

13. The system of claim 11, wherein at least two fuel injectors of the plurality of fuel injectors have different lengths.

14. The system of claim 11, wherein each of the plurality of mixing tubes extends between a first end and a second end, wherein the first end is configured to receive the one fuel injector and the second end is configured to deposit a fuel-air mixture directly into the combustion chamber.

15. The system of claim 11, wherein each of the plurality of fuel injectors comprises one or more holes configured to inject fuel into the respective mixing tube, and the respective one or more holes of a first fuel injector of the plurality of fuel injectors are the only holes formed in the first fuel injector that are configured to inject fuel directly into the first mixing tube, the respective one or more holes of the one of the plurality of mixing injectors are positioned at a third distance from the combustion chamber and the respective one or more holes of the another of the plurality of fuel injectors are the only holes formed in the another of the plurality of fuel injectors, and the respective one or more holes of the another fuel injector are positioned at a fourth distance different from the third distance from the combustion chamber.

16. The system of claim 11, wherein each fuel injector of the plurality of fuel injectors comprises one or more holes configured to flow the fuel from the respective fuel injector into the respective mixing chamber, the respective one or more holes are the only holes formed in the respective fuel injector that are configured to provide fuel to the respective mixing chamber and are positioned within a section of the respective fuel injector having a second discrete axial length less than a total length of the respective fuel injector, and an axial distance between the section of the annular wall and the section of the fuel injector is constant among the plurality of mixing tubes.

17. A method comprising:
  receiving air radially into a plurality of mixing chambers via apertures formed on a respective annular wall surrounding each of the plurality of mixing chambers, wherein each of the plurality of mixing chambers is within one of a plurality of mixing tubes;
  depositing fuel via holes formed on a plurality of fuel injectors into the plurality of mixing chambers, wherein the respective holes are formed upstream of a respective tip that forms a respective downstream end of a respective fuel injector of the plurality of fuel injectors, and each of the plurality of fuel injectors is positioned coaxially within one of the plurality of mixing tubes; and
  mixing the air and fuel within each of the plurality of mixing chambers, wherein a respective distance between the respective tip of the respective fuel injector of the plurality of fuel injectors and a respective outlet of the respective mixing chamber of the plurality of mixing chambers varies among the plurality of mixing tubes such that air-fuel mixing within a first mixing chamber of the plurality of mixing chambers is longer in duration than air-fuel mixing within a second mixing chamber of the plurality of mixing chambers.

18. The method of claim 17, wherein more than two different durations of air-fuel mixing occurs within the plurality of mixing chambers.

19. The method of claim 17, comprising depositing the air and the fuel directly into a combustion chamber from the first mixing chamber and the second mixing chamber of the plurality of mixing chambers.

20. The method of claim 17, wherein the apertures formed on the respective annular wall are positioned in a section that extends along a respective axial length of the respective annular wall, the remainder of the respective annular wall is devoid of the apertures, the respective section of the first mixing chamber is positioned a first distance away from a combustion chamber, and the respective section of the second mixing chamber is positioned a second distance away from the combustion chamber, and the first and second distances are different from one another, thereby facilitating the longer duration of air-fuel mixing within the first mixing chamber as compared to the second mixing chamber.

* * * * *